(No Model.)
E. S. BOYNTON.
GALVANIC BATTERY.
No. 557,355.  Patented Mar. 31, 1896.
FIG:1.
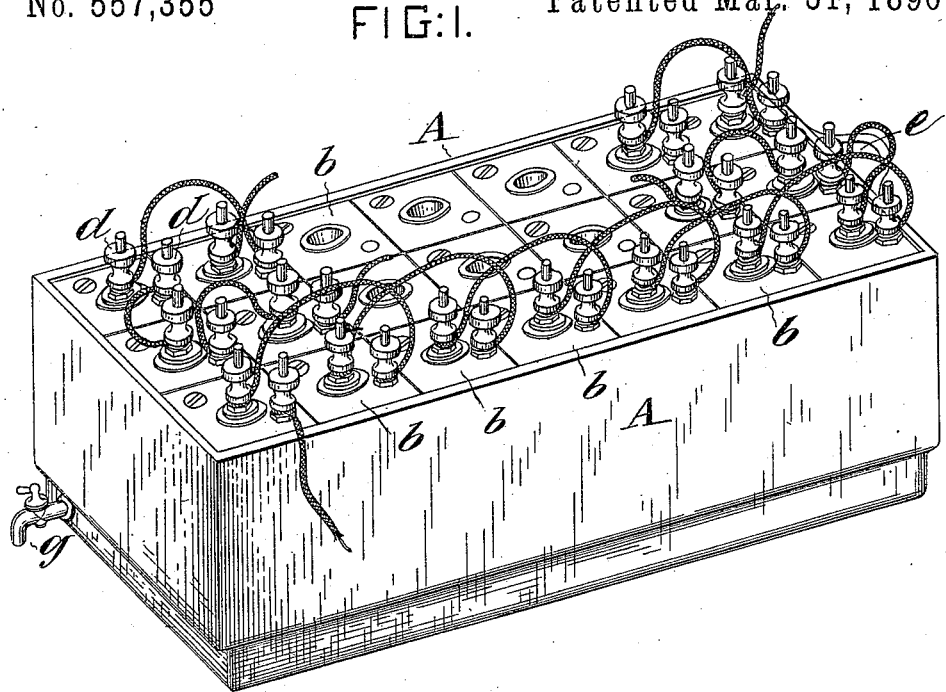
FIG:2.
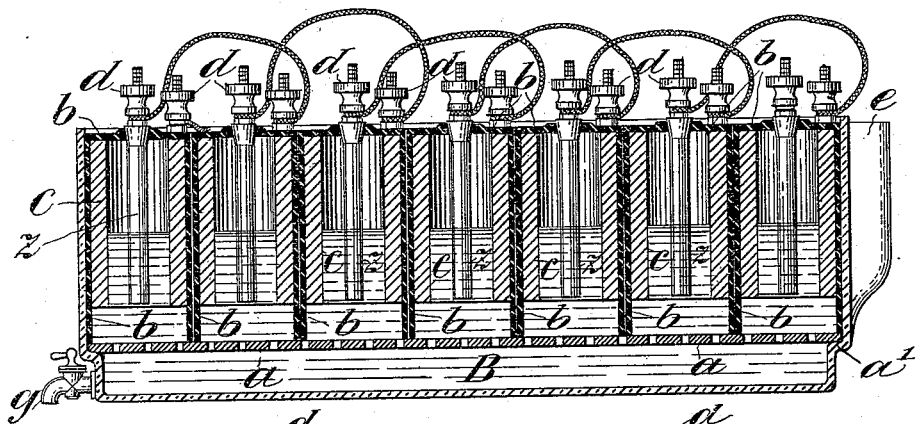
FIG:3. 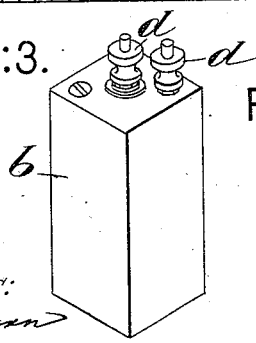  FIG:4.   FIG:5. 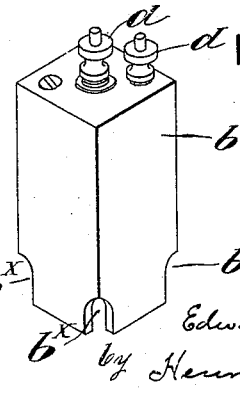
Witnesses:
J. H. Hinman
Peter A. Rose
Inventor:
Edward S. Boynton
by Henry Connett
his Attorney

UNITED STATES PATENT OFFICE.

EDWARD S. BOYNTON, OF BROOKLYN, NEW YORK.

GALVANIC BATTERY.

SPECIFICATION forming part of Letters Patent No. 557,355, dated March 31, 1896.

Application filed February 21, 1895. Serial No. 539,193. (No model.)

*To all whom it may concern:*

Be it known that I, EDWARD S. BOYNTON, a citizen of the United States, residing at Brooklyn, in the county of Kings and State of New York, have invented certain new and useful Improvements in Galvanic Batteries, of which the following is a specification.

My invention relates to galvanic batteries for generating electric currents; and the object is, in the main, to produce a relatively light and economical battery proportionately to the electromotive force generated, and one in which substantial uniformity may be easily maintained in the operation of the battery elements.

Another object of the invention is to provide for the convenient renewal of the electrolyte and to provide against the breaking of the circuit by the cutting out, from any cause, of one of the intermediate elements of the battery.

To this end the invention consists, broadly, in the employment of a common electrolyte for all of the elements and in the separation, by means of insulating material, of an electrode of one element from the corresponding electrode of the adjacent element. This separation and partial insulation of the elements, while all are immersed in a common electrolyte, enables me to attain uniformity in the electrolyte both as to strength and composition, and also as to depth of immersion of the electrodes, and it likewise prevents the breaking of the circuit fed by the generator should one of the intermediate elements be cut out from any cause as the current of the battery shunts around the defective cell through the electrolyte. It will be obvious that a battery possessing these characteristics may have various forms adapted to the various uses for which it is designed.

In the accompanying drawings I have illustrated one form or type embodying the principle.

In the drawings, Figure 1 is a perspective view of a battery embodying my invention and illustrating the principle. Fig. 2 is a longitudinal vertical section of the same, the plane of the section being taken through one of the rows of elements. Fig. 3 is a perspective view of one of the elements detached. Fig. 4 is a horizontal section of one of the elements. Fig. 5 is a view similar to Fig. 3, showing a slightly different form of construction.

Referring first to Figs. 1, 2, 3, and 4, A represents a receptacle to contain the elements and the liquid electrolyte B. As here shown, Fig. 2, the receptacle A has in it a loose false bottom $a$ supported on ledges $a'$ and perforated or apertured for the free passage of the liquid electrolyte. This false bottom forms a support for the elements and it may have any form or construction desired. The receptacle A and support $a$ may be made of any material which will not be acted on by the electrolyte, or it may be a simple box of the desired form lined with such material.

The elements may be all alike. As herein shown, each comprises a casing $b$, of some insulating material, as glass, hard rubber, or the like, open at the bottom and closed at the top. In this casing are suspended the carbon electrode $c$ and the zinc electrode $z$, each of which is provided with an ordinary binding-post $d$. The carbon electrode does not extend down to the lower edge of the open-bottomed casing $b$, and when the elements are immersed in the electrolyte the casings rest on the false bottom or support $a$, the vertical sides thereof being interposed as insulating-partitions between the corresponding electrodes of adjacent elements.

In Fig. 1 the elements are represented as square in plan and as of the proper dimensions to fit snugly and compactly in the receptacle A. They may, however, be of any suitable shape and dimensions. I have also represented, Fig. 4, the casing $b$ as square and the carbon $c$ as cylindrical; but they may both have the same form and fit snugly one within the other. The only advantage in making the carbon cylindrical and the casing square is that spaces are left at the inner angles of the casing to receive a manganese oxide to prevent polarization. This is desirable when certain liquid electrolytes are employed.

In Fig. 1 I have shown the elements connected in series, and have shown some of the elements with the zincs and binding-posts removed.

The receptacle A may be supplied with fresh liquid at $e$, and the liquid charged with zinc salts and impurities may be drawn off at $g$. The receptacle may be made of the proper dimensions to receive any desired number of elements.

The purpose of the support $a$ is mainly to provide access for the liquid to the electrodes in the casing $b$, and this may be provided for in other ways. For example, if the casing has a notch or notches formed in its lower edge it may rest directly on the bottom of the receptacle A and the false bottom be omitted. In Fig. 5 I have shown the casing $b$ provided with notches $b^\times$ at its corners. Any means which will permit the liquid to pass freely into the casing $b$ under or at its lower edge will suffice. I employ a bichromate solution for the battery, and although I employ a common electrolyte for all of the elements or cells of my battery I attain the voltage due to all of the elements when they are connected in series.

Having thus described my invention, I claim—

1. A galvanic battery comprising two or more elements grouped in one receptacle and having an electrolyte common to all, each element consisting of pairs of electrodes arranged one within the other, the outer electrode of each pair being held and supported in immediate juxtaposition with adjacent corresponding electrodes by means of a strengthening insulating medium or bond that extends downwardly to the full length of said electrodes, substantially as described.

2. A galvanic battery comprising two or more elements grouped in one receptacle and having an electrolyte common to all, each element consisting of pairs of electrodes arranged one within the other, the outer electrode of each pair being held in immediate juxtaposition with adjacent corresponding electrodes by means of a strengthening insulating medium or bond that projects vertically downward the full length of the cells to form separate compartments, a horizontally-arranged perforated bottom for said compartments thus formed that extends laterally the length of said receptacle and is supported thereby and which engages and supports the said partitions and that allows of the ingress and egress of the electrolyte to each of said compartments, substantially as described.

In witness whereof I have hereunto signed my name in the presence of two subscribing witnesses.

EDWARD S. BOYNTON.

Witnesses:
HENRY CONNETT,
PETER A. ROSS.